US005661376A

United States Patent [19]
George

[11] Patent Number: 5,661,376
[45] Date of Patent: Aug. 26, 1997

[54] SWITCHING CLAMP

[75] Inventor: John Barrett George, Carmel, Ind.

[73] Assignee: Thomson Consumer Electronics, Inc., Indianapolis, Ind.

[21] Appl. No.: 429,963

[22] Filed: Apr. 27, 1995

[51] Int. Cl.[6] .................................................. H01J 29/56
[52] U.S. Cl. ........................................................ 315/368.21
[58] Field of Search ............................ 315/371, 368.18, 315/368.21; 348/806

[56] References Cited

U.S. PATENT DOCUMENTS

| | | | |
|---|---|---|---|
| 4,395,662 | 7/1983 | Sexton, Jr. ............................... | 315/371 |
| 4,634,937 | 1/1987 | Haferl ...................................... | 315/371 |
| 4,868,464 | 9/1989 | Watanabe et al. ....................... | 315/371 |
| 4,972,127 | 11/1990 | Rodriguez-Cavazos et al. ....... | 315/371 |

Primary Examiner—Theodore M. Blum
Attorney, Agent, or Firm—Joseph S. Tripoli; Joseph J. Laks; Thomas F. Lenihan

[57] ABSTRACT

A circuit in accordance with an inventive arrangement comprises: a signal generator for a correction signal having a substantially parabolic shape at a scanning rate of the video display; a waveform clipper coupled to the signal generator for the correction signal, the waveform clipper having a current sink transistor coupled to the signal generator for the correction signal for clamping the correction signal, and a reference transistor coupled to a base of the current sink transistor for providing a reference voltage; and, a switch for disabling the reference transistor during excursions of the correction signal and enabling the reference transistor during clamping. The switch may comprise a switching transistor coupled to the reference transistor and to the correction signal, the switching transistor disabling the reference transistor during excursions of the correction signal and enabling the reference transistor during clamping.

19 Claims, 4 Drawing Sheets

SWITCHING CLAMP

BACKGROUND OF THE INVENTION

1. Field of the Invention

This invention relates to the field of video displays, and in particular concerns generation of beam deflection correction signals for cathode ray tube displays, using a stable, switched clamping circuit.

2. Description of Related Art

Certain geometrical raster distortions are associated with cathode ray tube displays. These distortions may be exacerbated in projection displays having a curved face plate CRT, with inherent magnification in the optical projection path. Curved face plate CRTs advantageously reduce projection path length and may simplify optical imaging. However, beam deflection may require especially shaped, highly stable, correction waveforms to counter raster distortion and to achieve convergence requirements imposed by large screen viewing.

Correction signals for countering pincushion distortion generally employ parabola-shaped waveforms at the horizontal and vertical scanning rates, coupled to adjust beam deflection by means of auxiliary deflection coils. A horizontal correction circuit is triggered by the retrace pulse applied to the flyback transformer and generates a generally parabolic horizontal rate driving signal coupled to the auxiliary deflection coils. Means can be included for controllably adding a tilt component to the correction signal to accommodate correction for projection beams that are not colinear. A waveform clipper is coupled to the signal generator means and clips the tilted correction signal to shape part of the correction signal.

The parabolic correction signal can be generated by triggering a ramp generator from the retrace pulse, the ramp generator having a constant current source coupled to charge a capacitor. The ramp voltage on the capacitor is integrated, for example using an operational amplifier having a capacitor in a feedback loop, to obtain a parabola signal for driving the auxiliary deflection coils. The capacitor is discharged by a signal derived from the retrace pulse, and the output of the operational amplifier is clamped, for example at −0.1 volts, for a time period between excursions of the parabola.

SUMMARY OF THE INVENTION

It is advantageous that the correction signal be highly stable over variations in temperature and in component values. This requires that the waveform clipper be highly stable as well. A stable clamp circuit can be obtained by coupling two transistors such that the base-emitter junction of one of the transistors provides a reference for the second transistor, which causes the two transistors to track over variations in temperature.

A circuit in accordance with an inventive arrangement comprises: means for generating a correction signal of a substantially parabolic pulses at a scanning rate of the video display; a waveform clipper coupled to the means for generating the correction signal, the waveform clipper having a current sink transistor coupled to the means for generating the correction signal for clamping the correction signal, and a reference transistor coupled to a base of the current sink transistor for providing a reference voltage; and, means for disabling the reference transistor during excursions of the pulses in the correction signal and enabling the reference transistor during clamping.

In further accordance with the inventive arrangement, and in the presently preferred embodiment, the means for disabling and enabling the reference transistor comprises a switching transistor coupled to the reference transistor and to the correction signal, the switching transistor disabling the reference transistor during excursions of the correction signal and enabling the reference transistor during clamping. The current sink transistor is reverse biased emitter-to-collector during the excursions of the correction signal. The correction signal is coupled to an emitter of the current sink transistor for reverse biasing the current sink transistor during the excursions. The reference transistor is coupled to a base of the current sink transistor. The switching transistor is coupled to pull down a voltage on the base of the reference transistor. The current sink transistor has a base coupled to the collector of the reference transistor. The clipper clips the tilted correction signal at a predetermined voltage magnitude.

BRIEF DESCRIPTION OF THE DRAWINGS

FIG. 2d representing an exemplary correction signal.

DETAILED DESCRIPTION OF THE DRAWINGS

Figure 1:
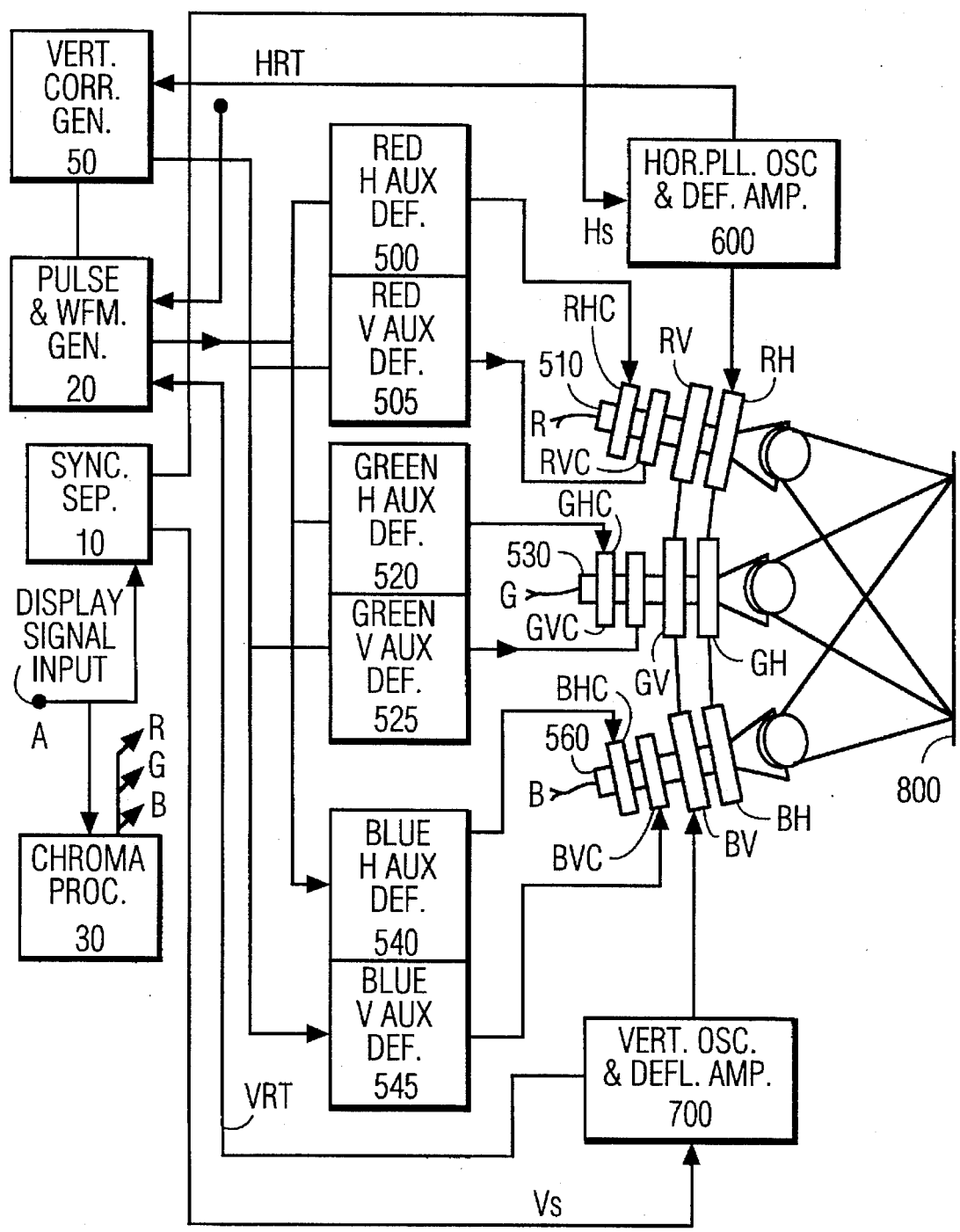
FIG. 1 is a simplified block diagram of a CRT projection display.

An exemplary video display employing cathode ray tube projection is shown in FIG. 1. Three cathode ray tubes are mounted to project overlapping images from CRT phosphor display surfaces to form a single raster on a screen. Each CRT displays an essentially monochromatic raster derived from a display signal input signal. The center CRT as shown, for example displaying green, can be orthogonal to the screen. The two other CRTs are laterally displaced from the center such that their rasters suffer trapezoidal geometrical distortion due to the displacement, requiring correction. In addition, other geometrical distortions may result from electron beam scanning.

Each of the cathode ray tubes shown in FIG. 1 has a curved, concave spherical phosphor display surface, which is useful for projection type CRTs. Examples of curved face plate cathode ray tubes include, for example, MATSUSHITA type P16LET07(RJA) for red, P16LET07(KA) for green and P16LET07(BMB) for blue. In order to cause the three rasters to register precisely on the screen, corrective deflection are generated to compensate for geometrical distortions resulting from one or more of the electron beam deflection means, the tube face plate shape, the screen configuration and the optical display path.

Figure 2A:
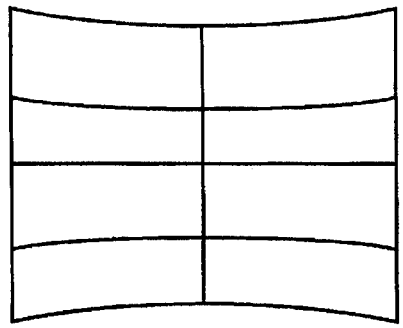
FIGS. 2a–2d are graphic illustrations of various geometrical raster distortions.
Figure 2B:
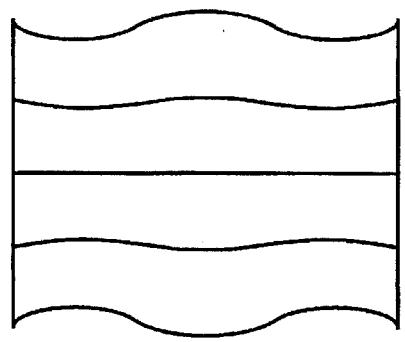
Figure 2C:
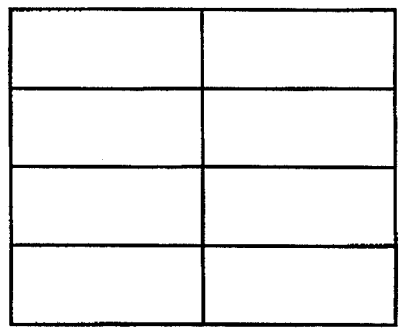

Various forms of geometrical distortion result from electron beam scanning. FIG. 2a illustrates distortion in the vertical scanning direction known as North-South pincushion distortion. With this form of distortion the vertical scanning speed may be considered to be modulated, producing incorrect positioning, bowing or sagging, of the horizontal line scan structure as shown in FIG. 2a. A similar distortion of the horizontal line scan structure known as gullwing distortion is shown in FIG. 2b, where line placement is bowed at a multiple of horizontal scanning rate. These distortions, together with the trapezoid distortion or the like resulting from projection at an angle relative to the screen center line are to be canceled to provide corrected rasters in precise registry on the screen, as illustrated in FIG. 2c, wherein the vertical positions of the horizontal scan lines of each raster are parallel and correctly placed to eliminate spurious colored edges or convergence errors.

North South pincushion distortion normally is corrected by driving auxiliary deflection coils with a horizontal rate parabola modulated by a vertical rate ramp signal. However, raster edge line placement errors may remain, particularly where concave face cathode ray tubes are employed in the projection optics. Thus the parabolic waveshape is shaped to produce the desired corrective effect at the edge of the raster. In addition the shaped parabolic waveform is horizontally phased to compensate for low pass filtering effects produced by the combination of slew rate limitation in the auxiliary deflection amplifier and inductance of the auxiliary deflection coil.

Methods for reducing geometrical and convergence errors are of limited value unless the resultant correction is stable with temperature variation, and is insensitive to power supply and beam current loading effects.

In FIG. 1, a display video signal is input at terminal A and is coupled to a chroma processor 30, which extracts color components, for example, red, green and blue, for controlling the beam current of cathode ray tubes 510, 530, 560. The three cathode ray tube displays are optically projected to overlap one another, forming a single image on screen 800. The video signal at terminal A is also coupled to a synchronizing pulse separator 10, which derives horizontal rate sync pulses HS, and vertical rate sync pulses VS. The separated horizontal sync pulses HS are coupled to a phase locked loop horizontal oscillator and deflection amplifier 600. Separated vertical sync pulses VS, are coupled to a vertical oscillator and deflection amplifier 700. The horizontal PLL oscillator and deflection amplifier 600 are coupled to three primary horizontal deflection coils, RH, GH, BH, which are connected in parallel. Coil RH represents the red horizontal deflection coil, and coils GH and GB represent the green and blue horizontal deflection coils respectively. Similarly, the vertical oscillator and deflection amplifier 700 is coupled to three vertical deflection coils connected in series, where RV represents the red vertical coil, GV and BV the green and blue coils respectively.

Deflection waveform correction is provided by corrective currents coupled to individual horizontal and vertical auxiliary deflection coils positioned, for example, on each tube neck. Auxiliary deflection coils RHC and RVC, deflecting in the horizontal and vertical directions respectively, are positioned on the red CRT neck. Auxiliary deflection coils GHC and GVC, and BHC and BVC, green and blue respectively, are located on the green and blue CRT necks. The auxiliary deflection coils are driven by auxiliary horizontal and vertical deflection amplifiers 500/505, 520/525, and 540/545, which represent the red, green and blue channels respectively. The red horizontal auxiliary deflection amplifier 500, comprises a summer/driver amplifier which develops a composite correction signal coupled to the horizontal auxiliary deflection coil RHC; for the red vertical auxiliary deflection amplifier 505, and likewise for the green and blue channels. The composite correction signal is developed by summation of a selection of signals having particular waveform shapes and individual amplitude control. Horizontal correction signals, which are generated by circuitry within a pulse and waveform generator 20, are coupled to the red, green and blue horizontal correction summing amplifiers, 500, 520 and 540.

A vertical correction signal generator 50 generates a correction signal which is coupled to the red, green and blue vertical correction summing amplifiers, 505, 525 and 545. The vertical correction signal generator 50 receives a horizontal retrace signal input HRT, from the horizontal oscillator and deflection amplifier 600, and a vertical rate sawtooth signal from the pulse and waveform generator 20. The pulse and waveform generator 20 receives a vertical rate pulse VRT, from the vertical Oscillator and amplifier 700 and the horizontal retrace pulse HRT from the horizontal deflection amplifier 600. In addition to generating deflection drive signals, the pulse and waveform generator produces various deflection waveform correction signals with the exception of North/South pincushion correction.

Figure 2D:
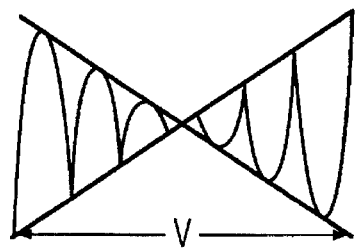
Figure 3:
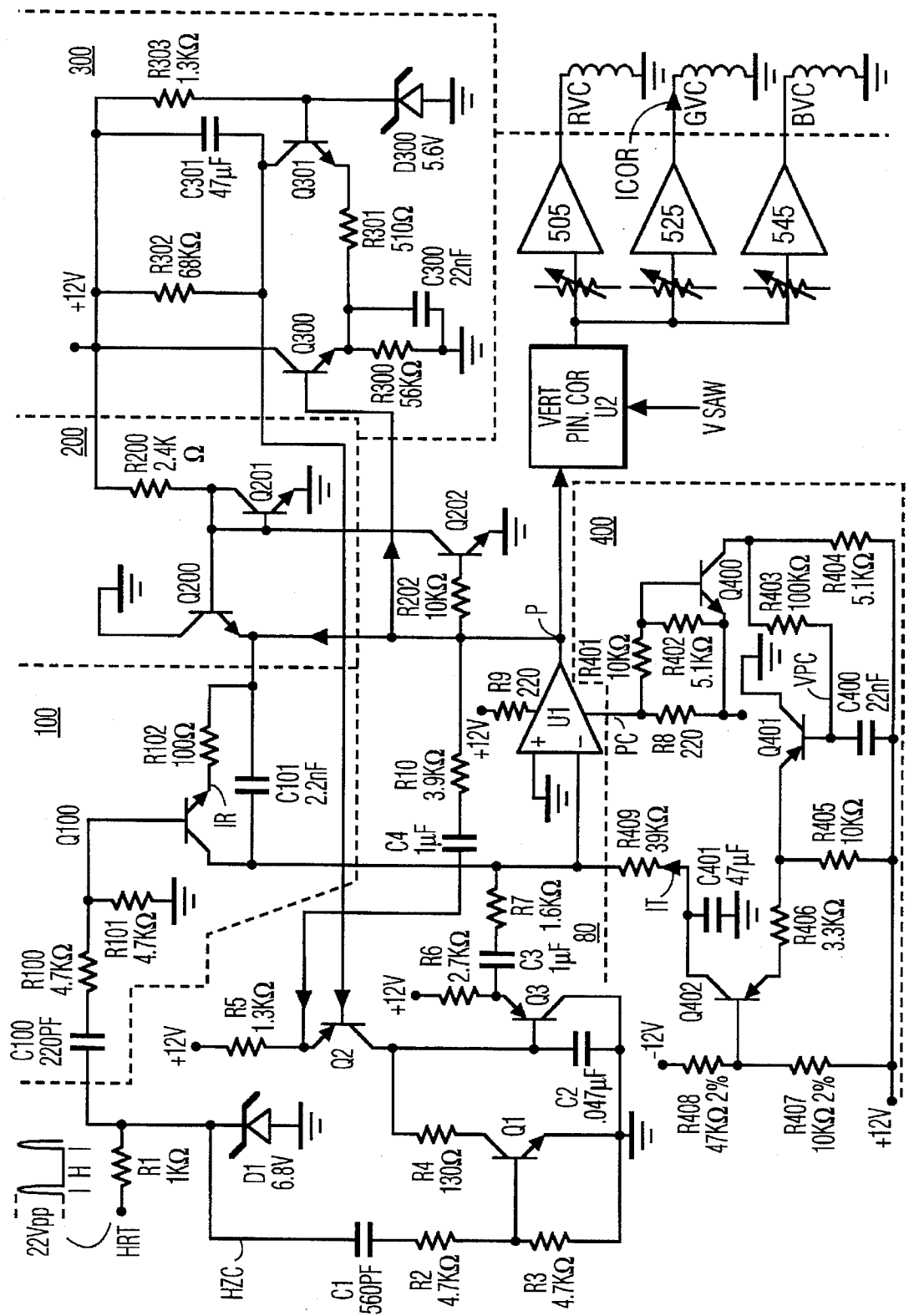
FIG. 3 is a simplified schematic drawing showing a circuit according to an inventive arrangement for generating correction signals.

A portion of the correction signal generator 50 that corrects vertical pincushion distortion is shown in detail in FIG. 3. The horizontal retrace pulse signal HRT, is used to generate a horizontal rate ramp signal which is integrated to form a horizontal rate, generally parabolically shaped signal. The parabolic signal is applied to a modulating circuit which is modulated by a vertical rate ramp signal. The modulating circuit generates a modulated signal comprising the parabolic shaped signal which is amplitude modulated responsive to the vertical rate ramp signal, as suggested by FIG. 2d. The vertical ramp modulates the parabolic signal, reducing the amplitude to zero at the center of the field period and then inverting the polarity. The modulated correction signal is coupled to the auxiliary deflection amplifiers 505, 525, 545, to produce a North South pincushion corrective current in the auxiliary deflection coils RVC, GVC, BVC, respectively.

Referring to FIG. 3, horizontal retrace pulse signal HRT is coupled via resistor R1 to the cathode of Zener diode clipper D1 which generates a clipped pulse ZC. The horizontal retrace pulse HRT has a nominally 22 volt peak amplitude, however the amplitude, shape and horizontal phasing of the peak on pulse HRT may be modulated by the video content of the displayed image, causing unwanted horizontal phase modulation of the correction signals. Zener diode clipper D1 has a breakdown voltage corresponding to the retrace pulse amplitude value at which the horizontal PLL oscillator is synchronized, for example nominally 6.8 volts, and triggers the correction waveforms at the same point on the leading edge of pulse HRT, to eliminate unwanted phase modulation between the deflection and correction signals.

The clipped retrace pulse HZC at the cathode of diode D1 is coupled to a series coupled capacitor C1 and resistors R2 and R3, to differentiate the clipped pulse. Resistor R3 is connected to ground and the junction of the resistors is connected to the base of a transistor Q1. The emitter terminal of transistor Q1 is connected to ground and the collector terminal is connected to a capacitor C2 via a resistor R4. The emitter terminal of transistor Q2 is connected to a +12 volt supply via a resistor R5 and the collector is connected to the junction of capacitor C2, resistor R4 and the base of a transistor Q3. Transistor Q3 functions as an emitter follower with the collector terminal connected to ground and the emitter terminal connected to the +12 volt supply via a resistor R6. Transistor Q2 forms a constant current source where the current magnitude is controlled by signals coupled to the emitter and base terminals. The collector current of transistor Q2 charges capacitor C2 to provide a nominally linear ramp voltage towards +12 volts. The differentiated positive edge of the clipped retrace pulse is applied to the base of transistor Q1 causing it to saturate for approximately 8 microseconds. Thus the ramp voltage, across capacitor C2 is discharged via transistor Q1 and resistor R4. The discharge time constant of ramp forming capacitor C2 is largely determined by resistor R4, which is selected to generate an exponentially shaped voltage discharge ramp.

The horizontal rate shaped ramp signal is coupled, via emitter follower Q3, to series connected capacitor C3 and resistor R7, which are coupled to an inverting input of an integrating amplifier U1. Amplifier U1 is powered from the +12 volt supply via a resistor R9, and from the −12 volt supply via a resistor R8. The non-inverting input of amplifier U1 is grounded. A feedback capacitor C101 is coupled between the output P of amplifier U1 and the non-inverting input. Thus amplifier U1 integrates the ramp signal to produce a correction signal of substantially parabolic pulses at output P.

Circuit 100 and amplifier U1 form a horizontal rate integrator and reset pulse generator. The clipped retrace pulse HZC is coupled to a series network comprising capacitor C100 and resistors R100 and R101. Resistor R101 is connected to ground and the junction of the resistors is connected to the base of a transistor Q100. The time constant of the series connected network differentiates the clipped retrace pulse with the positive edge causing transistor Q100 to saturate for 5 microseconds, generating an integrator reset pulse IR. Transistor Q100 discharges capacitor C101 via resistor R102 which is connected to the output P of amplifier U1, the collector of transistor Q100 being connected to the inverting input of amplifier U1. The discharge time constant of resistor R102 and integrating capacitor C101 is short, e.g., approximately 0.5 microseconds, such that integrator capacitor C101 is rapidly discharged and held reset for the remainder of the conduction period.

The ramp signal on capacitor C2 is coupled via capacitor C3 and resistor R7, to the inverting input of amplifier U1. The output signal P of integrator U1 is connected to an inventive switching clipper or active clamp circuit 200. Parabolic correction signal P is connected to an emitter terminal of a transistor Q200. The collector of transistor Q200 is connected to ground and the base is connected to the base of a transistor Q201. The base and collector terminals of transistor Q201 are connected together and to the collector of a switching transistor Q202, the base of which is coupled to the output P of amplifier U1 via series resistor R202. The emitter of transistor Q202 is connected to ground.

Transistor Q201 functions as a forward biased voltage reference diode which accurately determines the base-emitter voltage of clipper transistor Q200. The junction of the base and collector terminals of transistor Q201 are coupled to the +12 volt supply via a resistor R200.

Transistors Q200, Q201 make a temperature stable clamp at about −0.1 volts with about 20 mA from amplifier U1. The base-emitter junction of transistor Q201 provides a reference for transistor Q200, which runs at a higher current. The difference between the base-emitter voltage in Q201 and the base-emitter voltage of Q200 is determined by the ratio of the currents and these two voltages track one another over differences in temperature.

Figure 4:
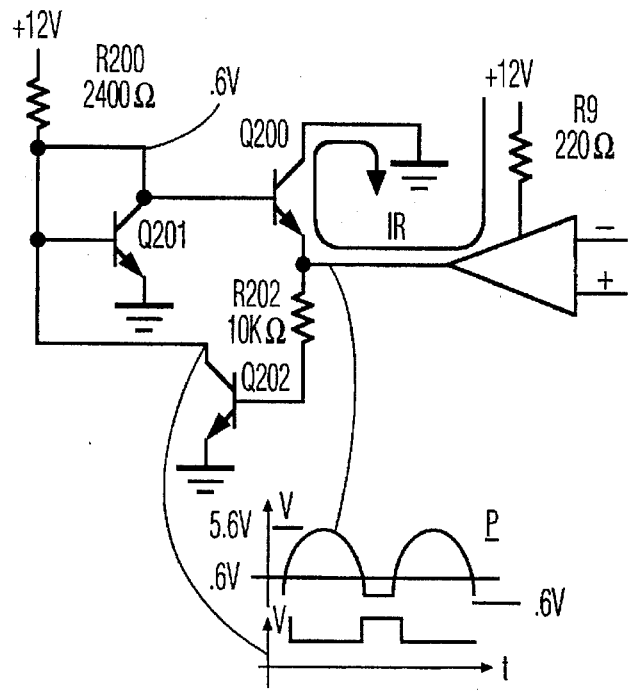
FIG. 4 is a partly schematic and graphic illustration showing a portion of the circuit of FIG. 3 in greater detail, including the resulting switching and clamped parabolic correction signals.
Figure 5:
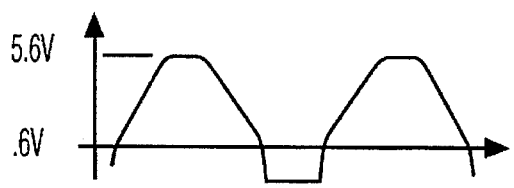
FIG. 5 is a waveform useful for explaining peak clipped parabolic correction signals.

Switching clamp 200 holds the parabola signal clamped between parabolas, as shown in FIG. 4. In the absence of transistor Q202, the base-collector junction of transistor Q200 is forward biased during the parabola part of the waveform, and the emitter is positive with respect to the base and collector. This causes a transistor action with the normal roles of the collector and emitter interchanged. The emitter-to-collector current is determined by the reverse current gain or beta characteristic of the transistor. Typically, the reverse beta current gain factor is on the order of 5, determined by the base to collector VI curve, an example of which is shown in FIG. 5.

Clamping circuit 200 performs like a current mirror sink load on amplifier U1, with a current amplitude that is the reverse beta factor multiplied by the base-to-collector current. This extra current load on amplifier U1 flows in the amplifier's positive supply resistor R9, and thereby reduces the supply voltage available to amplifier U1.

Figure 6:
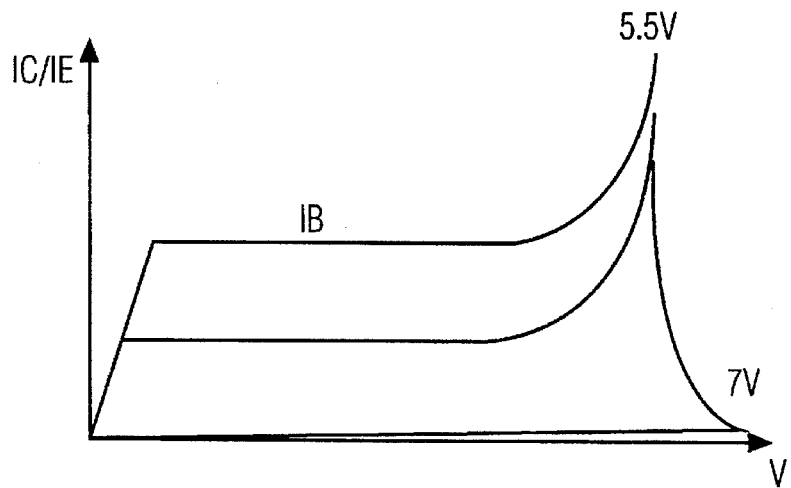
FIG. 6 is a graph useful for explaining characteristic transistor collector current vs. voltage for different base currents.

While the load current is small, amplifier U1 operates normally to integrate the ramp signal from capacitor C2, producing a waveform of substantially parabolic pulses as shown in FIG. 4. Undesired reverse conduction of transistor Q200 reduces the supply voltage to amplifier U1, eventually until the amplifying action of U1 ceases and the circuit clips the peak of the parabola and distorts the desired shape. Such undesired parabola peak clipping and distortion is shown in FIG. 5. Feed back to transistor Q200 maintains the peak amplifier output at 5.6 volts, as explained below. If the base/emitter current characteristic of transistor Q200 is such as to allow large emitter currents to flow below 5.5 volts, such as shown in FIG. 6, the undesired parabola peak clipping occurs.

Transistor Q200 preferably is specified and tested to have less than one micro amp of current at 6 volts emitter-to-base voltage with its collector open. A transistor can meet these conditions and still have a smaller than 6 volt emitter-to-collector reverse breakdown voltage when the base-collector junction is forward so biased. This can be appreciated from FIG. 6, by comparing the available emitter-collector voltage of the two biased curves to that of the baseline unbiased curve. In order to force the emitter-collector maximum voltage to approach equality with the emitter-base voltage (with collector open), it is sufficient to reduce the base-collector voltage until the base-collector junction does not conduct when the emitter-to-collector voltage is maximum. An inventive circuit to accomplish this employs a switching transistor Q202 as shown in FIG. 3.

Transistor Q202 is biased to turn on when the voltage at the output P of amplifier U1 is greater than 0.6 volts. The current in resistor R200 flows into the collector of transistor Q202 and the voltage at the base of transistor Q200 is pulled to near ground. Transistor Q200 thus loses its ability to forward bias the base-collector junction and the emitter current of transistor Q200 drops to the characteristic along the curve near zero current as shown in FIG. 6. This results in minimum load current on amplifier U1 during the parabola and maximum operating voltage from the emitter to collector of transistor Q200. During the clamp portion of the waveform between parabolas, transistor Q202 is switched off, and transistors Q200 and Q201 operate to clamp the output at −0.05 volts as described below. This switched clamping approach allows all transistors of the specified type to be used for transistor Q200, without the need for sorting for reverse current characteristics.

When transistor Q202 is not conducting (i.e., during clamping by transistors Q200, Q201), collector current in transistor Q200 is limited to approximately 5 milli amps. The current gain of transistor Q201, for example 100, establishes a base current of about 50 micro amps. The connection of transistor Q201 base and collector terminals results in feedback which generates a base/collector to emitter potential of approximately 0.55 volts, set by the base current of 10 micro amps. The 0.55 volts developed across transistor Q201 is applied to the base of transistor Q200 and thus establishes a temperature stable clamping potential at the emitter of transistor Q200, namely at the output P of amplifier U1.

Amplifier U1 can be an IC operational amplifier type L082, which has an internal current limitation of approximately ±25 milliamps, which determines the maximum current which may be conducted by transistor Q200 during clamping. Transistor Q200 has a current gain of, for example 100, thus, during clamping a base current of approximately 250 micro amps results, with a base-emitter voltage of approximately 0.6 volts. Since the base to emitter voltages of transistors Q200 and Q201 are tied together and track with temperature, a clamping potential of approximately −50 millivolts is established at transistor Q200 emitter. Thus negative voltage excursions at the output terminal P of integrating amplifier U1 are limited by the clamping action of transistor Q200 emitter to approximately −50 millivolts.

The parabolic shaped signal output P, of integrator U1 is connected via series connected resistor R10 and capacitor C4 to the emitter of transistor Q2, modulating the ramp forming current generated at the collector of transistor Q2 and reducing the slope of the ramp at the beginning and end, correcting for gullwing distortion by modifying the shape of the integrated ramp or parabola at the output P of amplifier U1.

The parabolic shaped output P of integrator amplifier U1 is also coupled to an amplitude control circuit 300 comprising transistors Q300, Q301, coupled in a differential arrangement to compare the is amplitude of parabola P with a reference voltage derived from Zener diode D300, to generate a controlling negative feedback voltage applied to the ramp current source generator transistor Q2. The parabolic signal P is coupled to the base of transistor Q300 which emitter coupled to transistor Q301 by resistor R301. The emitter of transistor Q300 is connected to ground via a parallel combination of resistor R300 and capacitor C300. Resistor R301 reduces gain and aids control loop stability. The base of transistor Q301 is connected to a reference potential of 5.6 volts at the junction of Zener diode D300 and a resistor R303, coupled to the +12 volt supply. Due to the base-emitter drop in transistor Q301, approximately 5 volts appears across capacitor C300. Preferably, the parabolas in output signal P trace smoothly around their peaks. Too large a parabolic signal may cause transistor Q100 to break down and clip output signal P. A maximum amplitude of 5.6 volts is selected to avoid break down of transistor Q100.

The collector of transistor Q301 is connected to a parallel combination of a resistor R302 and a capacitor C301 which are connected to the +12 volt supply. Resistor R302 and capacitor C301 form a low pass filter which smoothes the horizontal rate current pulses and generates a control voltage which is coupled to the base of transistor Q2 to control the amplitude of the modulated current source. The parabolic shaped signal P, coupled to the base of transistor Q300, causes current flow when the parabolic waveform peak exceeds the voltage across capacitor C300 plus the base-emitter voltage of transistor Q300. Parabola peaks exceeding the nominal 5.6 volts cause the voltage across capacitor C300 to increase and thereby decrease the base-emitter potential of transistor Q301, reducing collector current. The voltage drop across resistor R302 is reduced correspondingly, as are the current in ramp forming transistor Q2 and the amplitude of the ramp, restoring the correct amplitude of parabolic signal P. Thus the amplitude of correction signal P remains essentially constant, independent of power supply and component variations.

Pulse width control circuit 400 generates a direct current which is coupled by resistor R409 to the inverting input of amplifier U1. This signal IT contributes to the input signal integrated by amplifier U1, and is arranged to provide a horizontal rate tilt or ramp component to the output parabola signal P. The direct current coupled through resistor R409 is derived from measurement of a pulse width with reference to a potential derived by voltage divider resistors R407, R408, coupled between the positive and negative 12 volt power supplies. Switched clamping circuit 200 limits negative excursions of the parabolic signal P to −50 millivolts, by sinking current from the output of amplifier U1 sufficiently to invoke the internal current limiter of amplifier U1, for the duration of the clamped negative signal excursion. Current limiting of amplifier U1 may be sensed by monitoring the current provided by the −12 volt supply. At the onset of clipping, current increases to the limiting value and remains there. Since the −12 volt supply is coupled to amplifier U1 via a resistor R8, the supply current step to reach the limitation value causes a voltage step or pulse PC, due to the voltage drop across resistor R8, which remains for the duration of clamping action by circuit 200. Pulse PC is coupled to series connected resistors R401 and R402. Resistor R402 is connected to the −12 volt supply and the junction of the resistors forms a potential divider which is connected to the base terminal of a transistor Q400. Transistor Q400 functions as a saturating switch, with the emitter terminal connected to the −12 volt supply. The collector terminal of transistor Q400 is connected via a resistor R404 to the +12 volt supply. The collector of transistor Q400 is connected to a low pass filter formed by series connected resistor R403 and shunt connected capacitor C400. Capacitor C400 is connected to the +12 volt supply with the junction connected to the base terminal of an emitter coupled amplifier transistor Q401. The collector terminal of transistor Q401 is connected to ground and the emitter is connected to the +12 volt supply via a resistor R405. The emitter of transistor Q401 is coupled to the emitter of a transistor Q402 via a resistor R406. Transistors Q401 and Q402 form a differential amplifier with gain degeneration or loop damping, resulting from resistor R406 in series with the emitter of transistor Q402. The base of transistor Q402 is connected to the junction of voltage divider resistors R407 and R408, coupled between the positive and negative 12 volt supplies. The collector of transistor Q402 is decoupled from ground by capacitor C401 and is connected to the inverting input of integrating amplifier U1 via resistor R409.

The positive pulse PC at resistor R8 is amplified and inverted by transistor Q400. The inverted collector pulse is low pass filtered, or integrated, by resistor R403 and capacitor C400 to produce a DC voltage VPC. The low passed DC voltage VPC, has an amplitude which varies in proportion to the width of pulse PC. Voltage VPC is coupled the differential amplifier formed by transistors Q401 and Q402 where it is compared with the reference DC voltage from voltage divider resistors R407 and R408. Variations in the level of either supply cause a change in the reference potential and a compensating correction in pulse width.

The integrated effect of the corrective DC bias current IT, introduced by resistor R409, is to cause the output signal P of amplifier U1 to be superimposed on a shallow ramp having a slope proportional to the current IT. Thus parabolic signal P is tilted, with the waveform cusps having different DC potentials, and with negative parabolic signal excursions being clamped by switching clamp circuit 200.

The shaped parabolic correction signal P from integrator amplifier U1 is coupled to a balanced modulator circuit U2, which generates a vertical rate pincushion correction signal. The modulated output signal from circuit U2 is coupled via correction amplitude controls, shown generally, to auxiliary deflection amplifiers, 505, 525 and 545 and auxiliary vertical deflection coils RVC, GVC and BVC which correspond respectively to the red, green and blue color projection tubes. Integrated circuit U2 generates suppressed carrier amplitude modulation of the horizontal rate parabolic signal with a vertical rate sawtooth signal to produce the modulated waveform, or bow tie signal, illustrated in FIG. 2d.

The circuit as shown effectively advances the horizontal phase of parabolic signal P relative to the peak of horizontal retrace pulse HRT, and compensates for delaying effects present in the correction signal path. Hence deflection correction is provided which is horizontally centered with respect to horizontal deflection.

What is claimed is:

1. A circuit, comprising:
   means for generating a correction signal of substantially parabolic pulses at a video scanning rate;
   a waveform clipper having a current sink transistor coupled to said means for generating said correction signal for clamping said correction signal, and a reference transistor coupled to a base of said current sink transistor for providing a reference voltage; and,
   means for disabling said reference transistor during said pulses of said correction signal and enabling said reference transistor for said clamping between said pulses.

2. The circuit of claim 1, wherein said means for disabling and enabling said reference transistor comprises a switching transistor coupled to said reference transistor and responsive to said correction signal, said switching transistor disabling said reference transistor during said pulses and enabling said reference transistor between said pules.

3. The circuit of claim 2, wherein said current sink transistor is reverse biased emitter-to-collector during said pulses.

4. The circuit of claim 3, wherein said correction signal is coupled to an emitter of said current sink transistor for reverse biasing said current sink transistor during said pulses, and said reference transistor is coupled to a base of said current sink transistor.

5. The circuit of claim 4, wherein said switching transistor is coupled to pull down a voltage on a base and a collector of said reference transistor and said current sink transistor has a base coupled to said collector of said reference transistor.

6. The circuit of claim 5, wherein said clipper clips said correction signal at a predetermined voltage magnitude.

7. The circuit of claim 1, wherein said means for generating said correction waveform comprises a ramp generator operable to produce a signal of substantially linear ramps, coupled to an integrating amplifier.

8. The circuit of claim 7, further comprising means for controllably adding a tilt component to said correction signal.

9. The circuit of claim 7, further comprising means to maintain predetermined clipping duration.

10. The circuit of claim 7, further comprising a feedback connection to said ramp generator, for modulating said substantially linear ramp signal by said substantially parabolic pulses for providing a gullwing corrective effect.

11. An apparatus for correction of pincushion distortion in a video display, said apparatus comprising:
    means for generating a correction signal of substantially parabolic pulses;
    clamping means having a first transistor for sinking current from said generating means and clamping said correction signal and a second transistor providing a reference voltage to said first transistor; and,
    switching means coupled to at least one of said first and second transistors for disabling said clamping means during said pulses.

12. A video apparatus, comprising:
    at least one cathode ray tube and auxiliary beam deflection means coupled to said tube;
    means for generating a correction signal of substantially parabolic pulses;
    clamping means including a current sink transistor that is reverse biased emitter-to-collector during said pulses;
    a reference transistor coupled to said current sink transistor such that base-emitter voltages of said current sink transistor and said reference transistor are matched; and,
    a switching transistor coupled to said correction signal and operable to alter biasing of said reference transistor to disable said clamping means during said pulses.

13. The video apparatus of claim 12, wherein:
    said correction signal is coupled to an emitter of said current sink transistor for reverse biasing said current sink transistor during said pulses; and
    said reference transistor is coupled to a base of said current sink transistor.

14. The video apparatus of claim 13, wherein said means for generating said correction signal comprises an integrating amplifier coupled to a ramp generator.

15. The video apparatus of claim 14, wherein:
    said integrating amplifier comprises internal current limiting means; and,
    said clamping means sinks current from an output of said amplifier to activate said internal current limiting means during said clamping.

16. An apparatus for correction of raster distortion in a video display, said apparatus comprising:
    means for generating a raster distortion correction waveform of shaped pulses at a deflection rate;
    means for clamping said correction waveform; and,
    switching means coupled to said clamping means for disabling said clamping means during said pulses of said correction signal;
    said switching means being responsive to said correction signal.

17. An apparatus for correction of raster distortion in a video display, said apparatus comprising:
    means for generating a raster distortion correction waveform of shaped pulses at a deflection rate;
    means for clamping said correction waveform; and,
    switching means coupled to said clamping means for disabling said clamping means during said pulses of said correction signal;
    said clamping means comprising a first transistor for sinking current and a second transistor for supplying a reference voltage to maintain conduction of said first transistor.

18. The apparatus of claim 17, wherein said switching means changes said reference voltage to inhibit said conduction of said first transistor.

19. The apparatus of claim 18, wherein said switching means is responsive to said correction signal.

* * * * *